US009310987B2

(12) United States Patent
Rapoport et al.

(10) Patent No.: US 9,310,987 B2
(45) Date of Patent: Apr. 12, 2016

(54) PROJECTIONS TO FIX POSE OF PANORAMIC PHOTOS

(71) Applicant: Google Inc., Mountain View, CA (US)

(72) Inventors: Evan Rapoport, Los Altos, CA (US); Aaron Michael Donsbach, Seattle, WA (US)

(73) Assignee: Google Inc., Mountain View, CA (US)

( * ) Notice: Subject to any disclaimer, the term of this patent is extended or adjusted under 35 U.S.C. 154(b) by 264 days.

(21) Appl. No.: 13/969,698

(22) Filed: Aug. 19, 2013

(65) Prior Publication Data

US 2015/0052475 A1 Feb. 19, 2015

(51) Int. Cl.
| | |
|---|---|
| G06F 3/0484 | (2013.01) |
| G09B 29/00 | (2006.01) |
| G06F 3/048 | (2013.01) |
| G06T 7/00 | (2006.01) |
| G06F 3/0481 | (2013.01) |
| G06T 11/60 | (2006.01) |

(52) U.S. Cl.
CPC ............ *G06F 3/04845* (2013.01); *G06F 3/048* (2013.01); *G06T 7/004* (2013.01); *G06T 11/60* (2013.01); *G09B 29/003* (2013.01); *G06F 3/04815* (2013.01); *G06T 2207/30244* (2013.01)

(58) Field of Classification Search
CPC .................... G06T 11/60; G06T 7/004; G06T 2207/30244; G06F 3/048; G06F 3/0481; G06F 3/04815; G06F 3/04842; G06F 3/04845; G06F 3/0485; G06F 17/3087; G06F 17/30241; G06F 3/017; G06F 17/30268; G06F 17/30817; G06F 3/016; G06F 3/033; G06F 17/30265; H04N 5/23238; H04N 5/2628; H04N 5/23216; H04N 5/3415; H04N 21/6587; G01C 21/367; G01C 21/32; G01C 21/3635; G01C 21/3667; G06Q 50/16; G09B 29/10; G09B 29/008; G09B 29/005

See application file for complete search history.

(56) References Cited

U.S. PATENT DOCUMENTS

| | | | |
|---|---|---|---|
| 6,064,399 A * | 5/2000 | Teo ......................... | G06T 15/04 345/629 |
| 6,359,617 B1 * | 3/2002 | Xiong ............................ | 715/848 |
| 6,563,529 B1 | 5/2003 | Jongerius | |
| 7,096,428 B2 * | 8/2006 | Foote .................. | G06F 3/04815 707/E17.018 |
| 7,379,811 B2 | 5/2008 | Rasmussen et al. | |
| 8,453,060 B2 | 5/2013 | Ofek et al. | |
| 8,699,800 B1 * | 4/2014 | Chau ....................... | G06K 9/46 345/201 |

(Continued)

OTHER PUBLICATIONS

Conical Frustum retrieved from Internet at https://web.archive.org/web/20100411070714/http://mathworld.wolfram.com/ConicalFrustum.html, Apr. 11, 2010.*

(Continued)

*Primary Examiner* — Nicholas Ulrich

(74) *Attorney, Agent, or Firm* — Lerner, David, Littenberg, Krumholz & Mentlik, LLP

(57) ABSTRACT

Aspects of the disclosure relate generally to adding or correcting orientation and/or location information for panoramic images. For example, some panoramic images may be associated with inaccurate orientation (or location) information or simply no orientation information at all. In this regard, a user may be provided with the ability to add or adjust the orientation of a panoramic image. The panoramic image can be projected onto a plane using stereographic projection and displayed relative to its location (and orientation, if available) on a map. This can allow a user to quickly identify inaccuracies and to make adjustments or corrections.

11 Claims, 8 Drawing Sheets

(56) References Cited

U.S. PATENT DOCUMENTS

| | | | | |
|---|---|---|---|---|
| 8,884,950 | B1* | 11/2014 | Brown | G06T 15/00 345/419 |
| 8,937,617 | B1* | 1/2015 | Mudure et al. | 345/419 |
| 2002/0163547 | A1 | 11/2002 | Abramson et al. | |
| 2004/0169724 | A1 | 9/2004 | Ekpar | |
| 2005/0086612 | A1 | 4/2005 | Gettman et al. | |
| 2005/0220361 | A1 | 10/2005 | Yamasaki | |
| 2006/0075442 | A1 | 4/2006 | Meadow | |
| 2006/0132482 | A1* | 6/2006 | Oh | 345/419 |
| 2007/0070190 | A1 | 3/2007 | Yin et al. | |
| 2007/0076920 | A1* | 4/2007 | Ofek | G06T 3/4038 382/113 |
| 2008/0143727 | A1* | 6/2008 | Oh et al. | 345/474 |
| 2008/0238916 | A1* | 10/2008 | Ghosh et al. | 345/419 |
| 2008/0291217 | A1 | 11/2008 | Vincent et al. | |
| 2008/0292213 | A1 | 11/2008 | Chau | |
| 2009/0031246 | A1 | 1/2009 | Cowtan et al. | |
| 2009/0079731 | A1* | 3/2009 | Fitzmaurice et al. | 345/419 |
| 2010/0123737 | A1* | 5/2010 | Williamson et al. | 345/672 |
| 2011/0018902 | A1* | 1/2011 | Ofek | G06T 3/4038 345/629 |
| 2011/0279446 | A1* | 11/2011 | Castro et al. | 345/419 |
| 2012/0209892 | A1* | 8/2012 | MacAskill et al. | 707/812 |
| 2013/0086517 | A1* | 4/2013 | Van Lancker et al. | 715/800 |
| 2013/0162665 | A1* | 6/2013 | Lynch | G09B 29/106 345/589 |
| 2013/0335446 | A1* | 12/2013 | Piippo | G06F 3/04815 345/633 |
| 2014/0002439 | A1* | 1/2014 | Lynch | G09B 29/007 345/419 |
| 2014/0169699 | A1* | 6/2014 | Li | 382/285 |

OTHER PUBLICATIONS

Kim et al., Projective Texture Mapping with Full Panorama, Eurographics 2002 / G. Drettakis and H.-P. Seidel vol. 21 (2002), No. 3.*

"Business Photos: Attract More Customers with Business Photos" [online], <maps.google.com/help/maps/businessphotos>, Jul. 11, 2013, 2 pages.

"Flexify Tutorial for Tiny Planets (and other photo fun)", [online], <weaver.net/blog/2009/06/flexify-tutorial-for-tiny-planets-and-other-photo-fun>, Jun. 25, 2013, 3 pages.

"Frequently Asked Questions", [online], <maps.google.com/help/maps/businessphotos/faq.html>, Jul. 11, 2013, 10 pages.

"Stereographic Projection", [online], <en.wikipedia.org/wiki/Stereographic_projection>, Jun. 24, 2013, 14 pages.

Ashdav, "Thread: Tiny Planets from Panoramic Photos", [online], <forums.finalgear.com/photography-tutorials/tiny-planets-from-panoramic-photos-36628>, Jun. 15, 2009, 10 pages.

D.M. German, L. Burchill, A. Duret-Lutz, S. Pérez-Duarte, E. Pérez-Duarte and J. Sommers, Flattening the Viewable Sphere, Computational Aesthetics in Graphics, Visualization, and Imaging (2007), The Eurographis Association, 2007, 6 pages.

Daniel Wagner, Alessandro Mulloni, Tobias Langlotz, Dieter Schmalstieg, Real-Time Panoramic Mapping and Tracking on Mobile Phones, Graz University of Technology, 2010, 8 pages.

Steve McQuinn, Google Panoramas, [online], <https://support.simulationcurriculum.com/entries/23698217-Google-Panoramas-by-Steve-McQuinn>, Jun. 27, 2013, 4 pages.

* cited by examiner

PROJECTIONS TO FIX POSE OF PANORAMIC PHOTOS

BACKGROUND

Various systems may provide users with images of different locations. Some systems provide users with panoramic images or panoramas having a generally wider field of view. While there is no fixed definition of a panoramic image, panoramas may include those which simply provide an unbroken view of a scene or more technically, images having a field of view which is greater than that of the human eye, for example, 180 degrees or greater. Some panoramas may provide a 360 degree view of a location. In this regard, a panoramic image may comprise a single image or a series of images stitched together to form a single scene.

As an example, one or more panoramas may be strung together based on their location and orientation, or pose, such that a user may move from viewing one image to another image is a "virtual tour" of a space. If the panoramas are not oriented correctly, the transition between these panoramas can be very confusing: if a user is viewing a first panorama oriented in one direction (for example, north) and then transitions to a second panorama oriented incorrectly (for example, the northern direction is incorrectly labeled as the south) rather than moving forward in the space of the first panorama, the user may have the feeling of turning around or facing the wrong direction.

Some systems provide technologies for creating these virtual tours that typically have the photographer click on a part of an image and indicate a panorama which should be hotlinked to that spot, but these systems do not address correcting location and pose information.

SUMMARY

One aspect of the disclosure provides a computer-implemented method. The method includes receiving, by one or more computing devices, a request for a panorama associated with pose information; generating, by the one or more computing devices, a representation of the panorama; displaying, on a display, a map based on location information associated with the panorama; overlaying, by the one or more computing devices, the representation onto the display of the map at a first orientation based on the location information associated with the panorama; receiving, by the one or more computing devices, user input indicating a change to the first orientation; and updating, by the one or more computing devices, the pose information based on the user input.

In one example, the method also includes providing the updated pose information to a server computer. In another example, the representation is a side view of a frustum with a portion of the panorama projected onto an interior surface of the frustum. In another example, the method also includes displaying the panorama proximate to the display of the map, and wherein the user input indicates a dragging action on the representation. In another example, the method also includes, in response to receiving the user input, sliding the features of the panorama without changing position of the panorama relative to the display of the map and rotating the representation relative to the display of the map in a direction of the dragging action. In another example, the method also includes displaying the panorama proximate to the display of the map, and wherein the user input indicates a dragging action on the panorama. In this example, the method also includes, in response to receiving the user input, rotating the representation relative to the display of the map and sliding the features of the panorama in a direction of the dragging action without changing position of the panorama relative to the display of the map. In one example, the representation is a stereo graphic projection.

Another aspect of the disclosure provides a system. The system includes one or more computing devices configured to receive a request for a panorama associated with pose information from a user computing device; provide, in response to the received request, a representation of the panorama to the user computing device for a first orientation based on the pose information associated with the panorama; provide for display, on the user computing display, a map based on location information associated with the panorama; receive, from the user computing device, user input indicating a change to the first orientation; and update the pose information associated with the panorama based on the user input.

In one example, the representation is a stereographic projection. In another example, the representation is a side view of a frustum with a portion of the panorama projected onto an interior surface of the frustum. In another example, the one or more computing devices are configured to provide for display the panorama proximate to the display of the map, and wherein the user input indicates a dragging action on the representation. In another example, the one or more computing devices are further configured to provide for the display the panorama proximate to the display of the map, and wherein the user input indicates a dragging action on the panorama. In another example, the method also includes receiving a request for the panorama from a second user computing device and providing the panorama with the updated pose information to the second user computing device.

A further aspect of the disclosure provides a computer readable storage device on which computer readable instructions of a program are stored. The instructions, when executed by a processor, cause the processor to perform a method. The method includes receiving a request for a panorama associated with pose information; generating a representation of the panorama; displaying a map based on location information associated with the panorama; overlaying the representation onto the display of the map at a first orientation based on the location information associated with the panorama; receiving user input indicating a change to the first orientation; and updating the pose information based on the user input.

In one example, the method also includes providing the updated pose information to a server computer. In another example, the representation is a side view of a frustum with a portion of the panorama projected onto an interior surface of the frustum. In a further example, the method also includes displaying the panorama proximate to the display of the map, and wherein the user input indicates a dragging action on the representation. In this example, the method includes, in response to receiving the user input, sliding the features of the panorama without changing position of the panorama relative to the display of the map and rotating the representation relative to the display of the map in a direction of the dragging action. In another example, the method also includes displaying the panorama proximate to the display of the map, and wherein the user input indicates a dragging action on the panorama.

DETAILED DESCRIPTION

Panoramas that are properly geographically located and posed can be used to provide new and better use cases for user-facing image products. Thus, it is important to be able to add or correct inaccurate or missing location and pose information. The aspects described herein allow correction of such information. Besides correcting location and pose information, the increased accuracy of this information can enable the creation and use of better end user experiences.

For 360-degree panoramas to be accurately placed on a map, the panoramas must not only be associated with correct geographic location information, but must also have the proper compass heading or pose to be oriented correctly. This can be critical for applications which allow users to virtually walk from one panorama to the next. However, while many panoramas may be associated with location information, for example, provided by the camera or other device which captured the original image or images, often pose information is unavailable.

Providing a user interface that makes it easy for users to fix or add the pose of a panorama can be difficult when it requires matching a first person perspective of a panorama with a bird's eye view of a map. Landmarks and other objects can be used to help, but it can be visibly confusing or even jarring for a person to see two different perspectives together and correlate them. For example, when the user needs to connect multiple panoramas together, such as for a virtual tour experience, this process can become very complicated for non-experts.

Insomuch as various embodiments provide a user to modify the location of another user's (e.g., the uploading user's) panoramas, the uploading user may include a time limit on the use and dissemination of panoramic images. Similarly, if a user wants to share images privately, or only with a particular set of users, such images may be excluded. In addition, users may predesignate or identify particular ones of their own panoramic images for which they would like to allow correction of the orientation or location.

Overview

The aspects described herein allow users to add or correct location and pose information for panoramas. A representation of the panorama, such as a projection of all or a portion of a panorama, may be displayed relative to a map. By doing so, a user may easily recognize incorrect location and/or pose information for the panorama.

Figure 1:
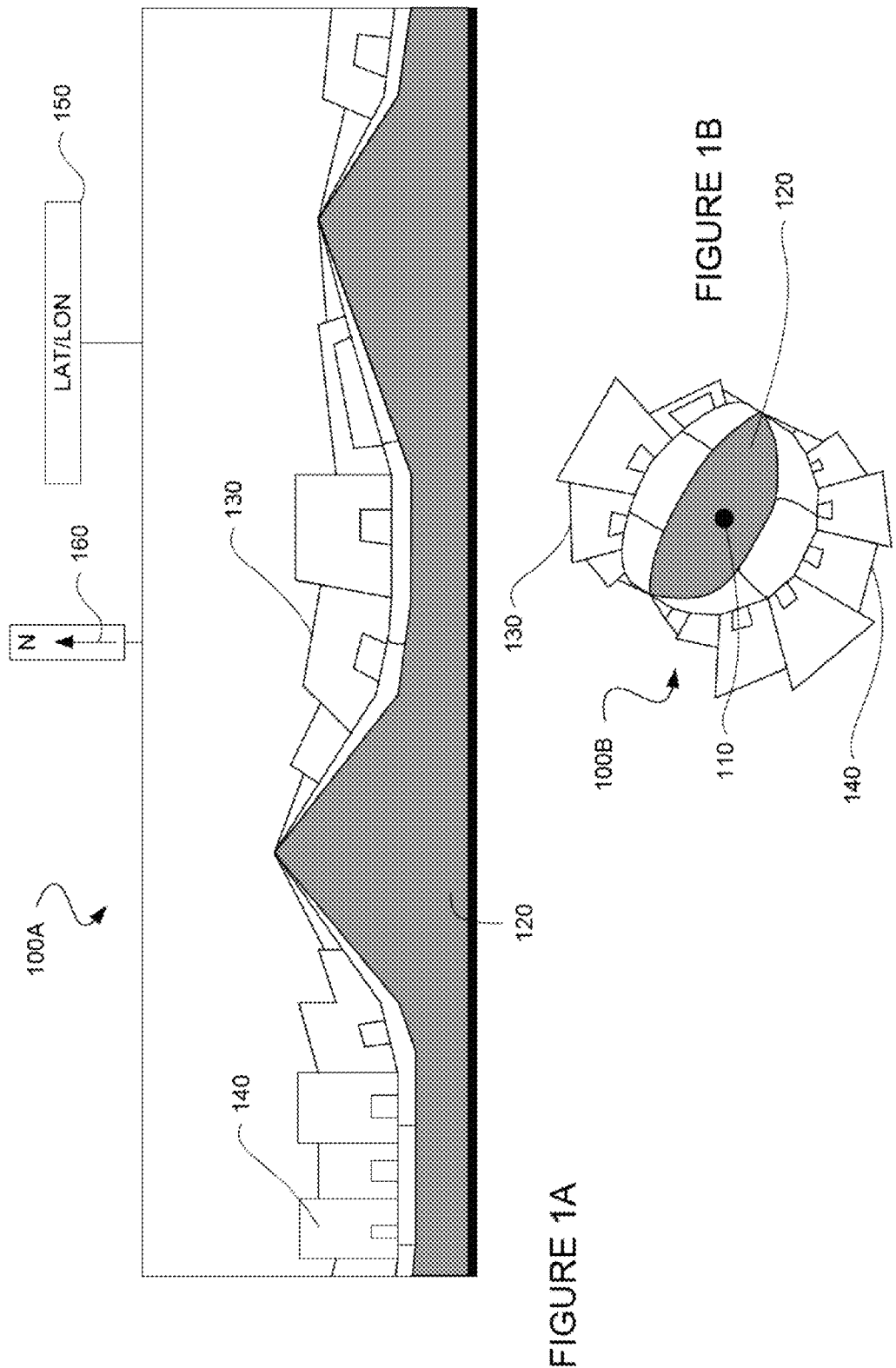
FIG. 1A is an example panorama in accordance with aspects of the disclosure.
FIG. 1B is an example stereographic projection in accordance with aspects of the disclosure.

As an example, a panorama can be projected onto a plane using stereographic projection. Stereographic projection is a projection of a sphere onto a plane. In photography, the projection of a 360-degree panoramic image onto a plane is often called a "tiny planet." FIG. 1A is an example of a 360 panoramic image 100A stitched together form several images or recorded as a single image. FIG. 1B is an example stereographic projection 100B for the panoramic image 100A where the plane of projection is at the nadir, and the point of projection at the zenith. In this example, the panorama was captured while the photographer was standing at location 110 in the middle of a street 120. In this example, Panorama 100A is also associated with pose data 150 and location coordinates 160 (here defined in latitude and longitude, though other coordinate systems may also be used). The projection 100B provides a distorted two-dimensional (2D) view of the panorama. As an example, buildings 130 and 140 appear to stretch as they extend away from location 110, giving the projection of the panorama a planet-like appearance. Although the examples used herein include an outdoor setting, the panoramas may also include images of indoor settings or combinations of indoor and outdoor settings.

The projection of a panorama may then be displayed relative to its location (and pose, if available) on a map. As noted above, the projection can be easily lined up on a map because landmarks in it will correspond to the landmarks on the map (i.e. building 140 is located in the north direction in the image 100A, and it is located at the top of the stereographic projection). This can allow a user to quickly identify inaccuracies. The user may also be provided with various tools which allow the user to make adjustments or corrections.

A particular panorama can also be "connected to" other panorama, for example in a virtual tour. For example, a user may be able to view panoramas in sequence using the orientation of those panoramas, giving the user the feeling of touring a location such as the interior of a home for sale, a museum, an outdoor location, etc. Using the example of a home, one panorama may capture a hallway, if the user is oriented towards an end of the hallway, the user may next be shown an image of a room at the end of the hallway. In such an example the corrected location and/or pose information may also be used to correct or otherwise adjust relationships between that particular panorama and the other panorama. By adjusting these relationships, the transitions a user experiences between panoramas may become significantly smoother.

EXAMPLE METHODS

Figure 7:
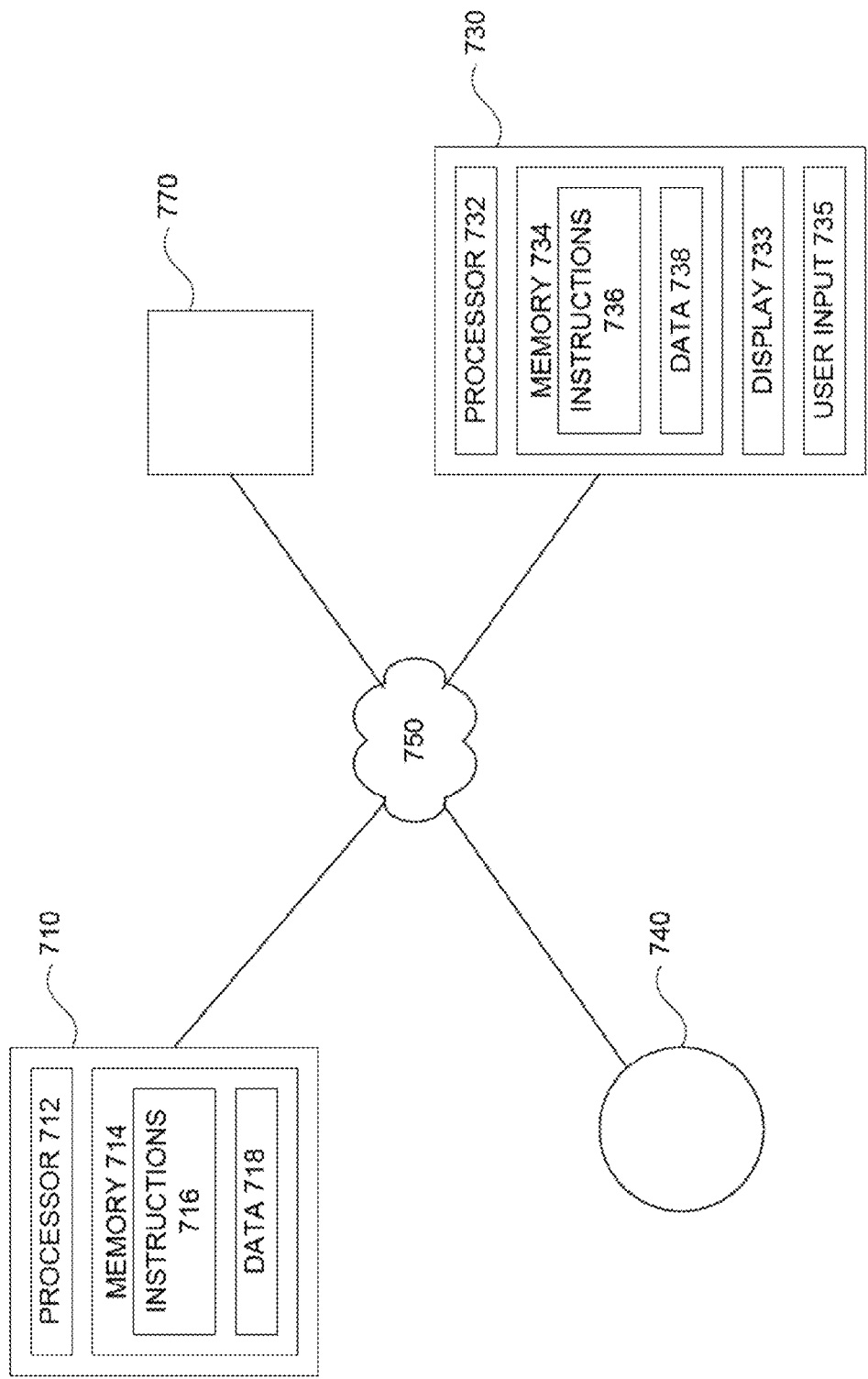
FIG. 7 is a functional diagram of a system in accordance with aspects of the disclosure.
Figure 8:
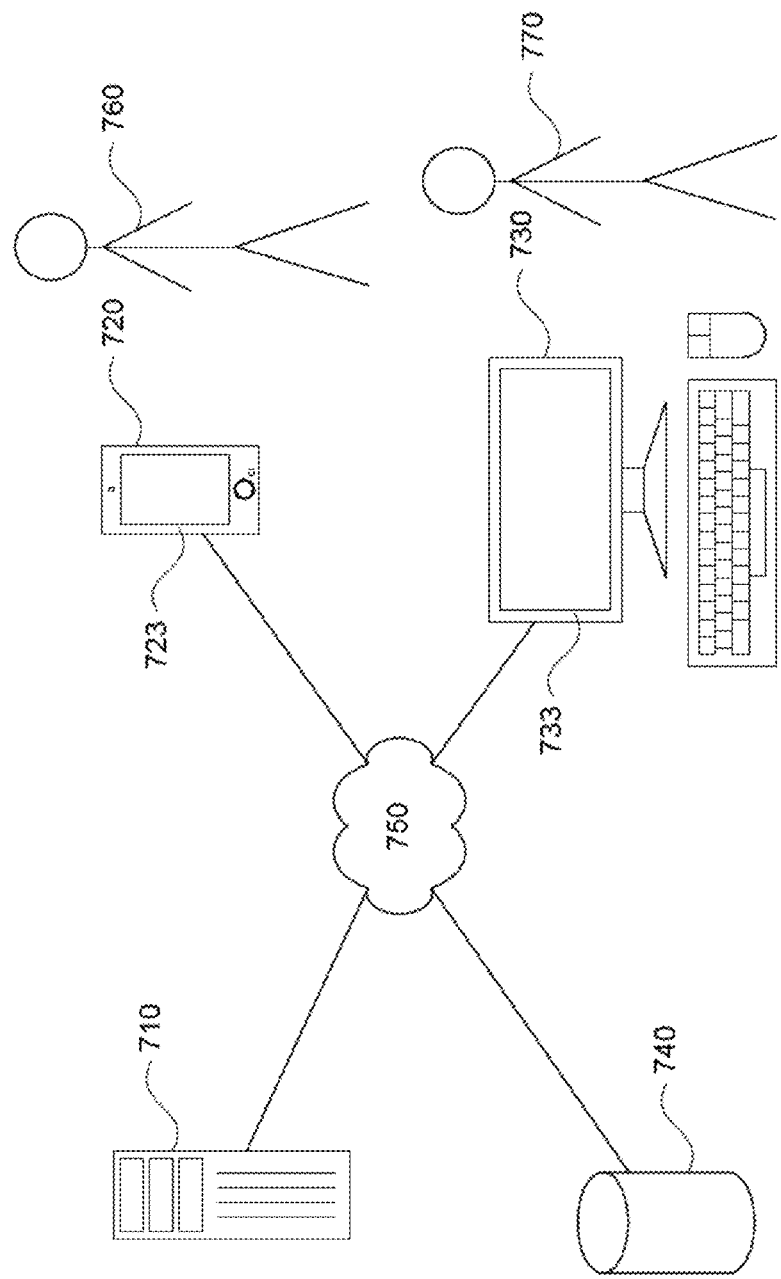
FIG. 8 is a pictorial diagram of the system of FIG. 7.

As an example, a user using a computer may be attempting to generate a virtual tour as described above, browsing panoramic images, or an administrator tasked with reviewing and correcting pose and location data for panoramic images. FIGS. 7 and 8 are an example of a system that may be used to describe such features. For example, a user such as users 760 or 770 using a computer such as computer 720 or 730, may correct the pose of panorama. In order to do so, as mentioned above, a user may request, for example by clicking using a mouse or using a touch screen to select a panorama for viewing relative to a map.

In response, the computer may identify location information associated with the selected panorama, and use this information to identify a relevant portion of map data. For example, the location information map data may be retrieved from local storage at the computer using the location information. Alternatively, the computer may send a request to a server, such as server 710 of FIGS. 7 and 8, for the location information and/or map data. The request may include information identifying the requested panorama or, if available, may include location information associated with the panorama, for example, where the panorama was taken. The server may receive or identify the location information associated with the panorama and use the location information to retrieve a relevant portion of map data and send the relevant portion of map data to the user's computer. The computer may then use the relevant portion of map data to render a map on a display of the user's computer. This map may include a roadmap, a satellite view with annotated roads or other features, a floor plan of a building, etc.

Figure 2:
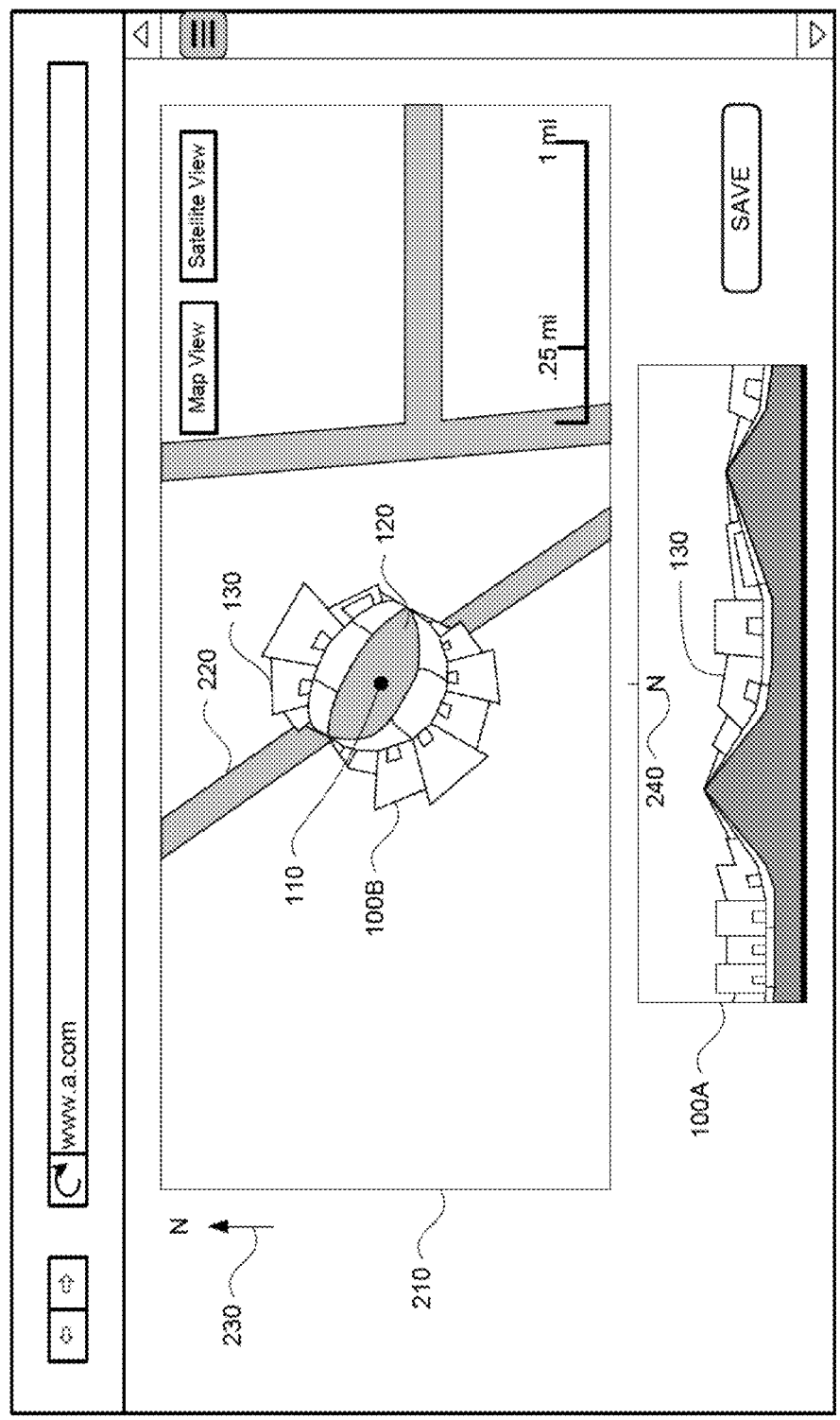
FIG. 2 is an example screen shot in accordance with aspects of the disclosure.

In addition to displaying the map, the computer may also display a representation of the requested panorama. As noted above, in order to display the panorama relative to the map, the computer may generate a stereographic projection of the panorama and display the projection, rather than the requested panorama, on the map. FIG. 2 is an example screen shot 200 of a display projection 100B over a map 210. In this example, screen shot 200 also includes panorama 100A.

The location and orientation of projection 100B relative to map 210 is determined from the location information 160 and pose information 150 associated with panorama 100A. In this regard, projection 100B is overlaid on map 210 at a location defined by location information 150 over road 220 and with an orientation defined by pose information 160. Thus, the location of north of the projection (center of building 130) is oriented in the same direction as north of map 210, indicated by pointer 230. In addition, the direction of north, indicated by icon 240, in the panorama 100A is positioned in the center of the panorama image.

In addition to or in lieu of the pose pointer and icons of screen shoot 200, other symbols, markers or references may also be displayed to indicate the pose of the map, satellite image, or panorama. In other examples, such indications of pose need not actually be displayed.

Once the user is viewing the representation of the panorama relative to the map, the user may easily recognize incorrect location and pose information. Returning to the example of FIG. 2, street 120 of projection 100B (and panorama 100A) may correspond to street 220 of map 210. As can be observed from FIG. 2, street 120 of projection 100B is not oriented along street 220 of map 210, but is slightly offset. Thus, it is apparent, that the pose of panorama 100A is incorrect.

Figure 3:
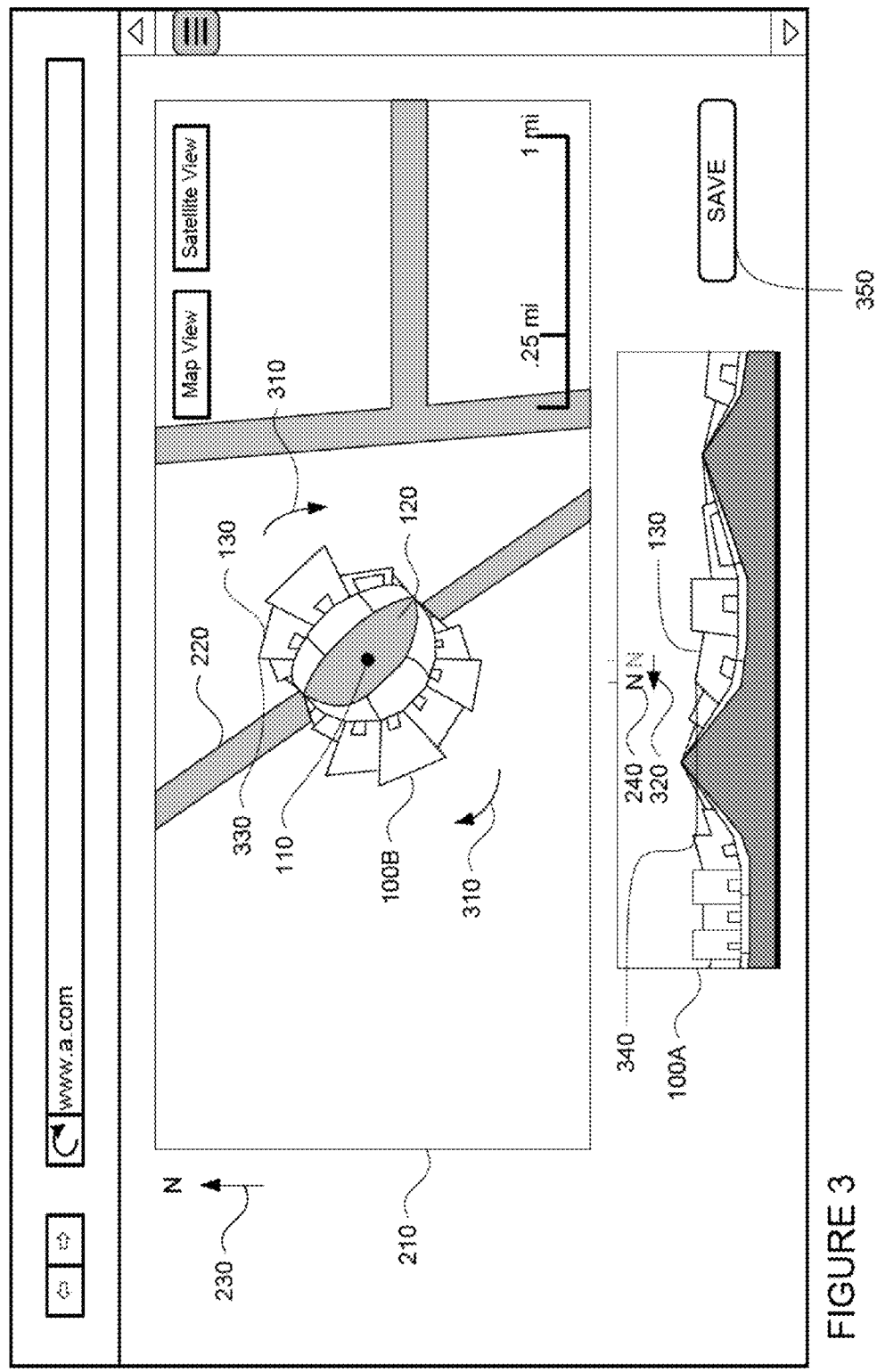
FIG. 3 is another example screen shot in accordance with aspects of the disclosure.

The user may adjust the orientation of the representation relative to the map. This may be achieved in various ways. In one example, a user may use a user input device of the computer, such as a mouse and mouse pointer or a touch screen, to rotate the image of the projection to the correct orientation. In the example of FIG. 3, the user has rotated the projection 100B in a clockwise direction (in the direction of arrows 310) until street 120 appears to align with street 220.

In response to the user input, the computer may indicate a change in the pose of the panorama. For example, referring to the example of FIG. 3, as the user rotates the projection 100B, the location of the icon 240 of panorama 100A may appear to "slide" to the left in the direction of arrow 320 without changing the position or image of the panorama 100A. The location of icon 240 as it was shown in FIG. 2 is depicted in gray in FIG. 3 for reference. In the example of FIG. 3, when the streets are aligned, edge 330 of building 130 in projection 100B may now be oriented towards north of map 210. In response, the computer may "slide" the icon 240 so that it is in line with edge 340 of projection 100B. Similarly, rotating the projection 100B in a counterclockwise direction may cause the icon 240 to "slide" to the right. This may clearly indicate to the user how the pose of the panorama would change, in this example where the direction of north would be, when the orientation of the projection is changed.

Figure 4:
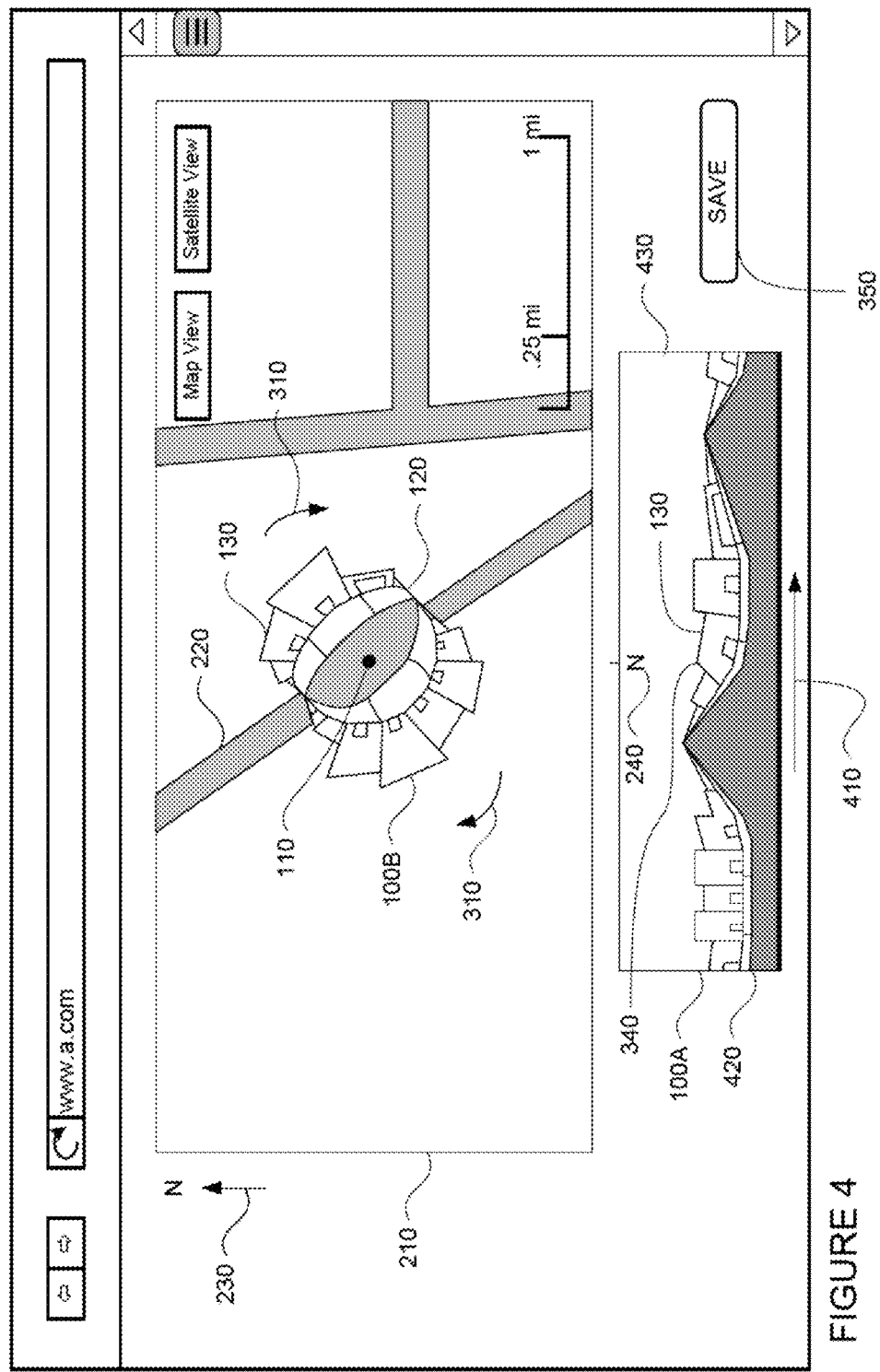
FIG. 4 is an example screen shot in accordance with aspects of the disclosure.

In another example, rotating the representation may cause the image of the panorama to change. For example, as shown in FIG. 4, rotating the projection in the direction of arrows 310 may cause the panorama 100A to appear to "slide" from left to right along arrow 320. In other words, while the position of panorama 100A need not change relative to the display of the computer, the features within the panorama may shift to the right. In this example, icon 240 remains stationary between the examples of FIGS. 2 and 3. Thus, rather than moving the icon 240, the building 130 and other features of the panorama 100A appear to slide to the left. Objects that would move past the boundary 420 of the panorama would disappear from the left of the panorama and appear at the boundary 430. This effect may be realized by comparing the image of panorama 100A of FIG. 3 with that of FIG. 4. Similarly, rotating the projection 100B in a counterclockwise direction may cause the image of the panorama 100A to "slide" to the left. Thus, in this example, the center of a displayed panorama may be used as a relative reference location in that the center of the panorama 100A may always indicate what features of the panorama correspond to the northern direction of the panorama 100A. Again, this may clearly indicate to the user how the pose of the panorama would change, in this example where the direction of north would be, when the orientation of the projection is changed.

In another example, dragging the image of the panorama so that it appears to slide (as described above with regard to FIG. 4) may also cause the representation to rotate. For example, a user may use a user input device to "grab" and "drag" the image of the panorama 100A and slide the image, without changing the location of where the panorama is displayed on the display of the computer. As an example, sliding the image of the panorama to the right along direction arrow 410 may cause the features in the panorama to shift to the left. Features that would pass edge 430 may appear again at edge 420. At the same time, the projection 100B may rotate counterclockwise so that the features at the center of the panorama 100A correspond to features oriented in the north direction of map 210 of projection 100B. Similarly, sliding the image of the panorama 100A to the left may cause the projection to rotate in a clockwise direction (in the direction of direction arrows 310)

Although the examples herein discuss using the direction of north as a reference to the user, other particular directions (such as south, east, west, northwest, etc.) or relative directions (such as "left", "right," "up" or "down" relative to a displayed map) may also be used. In addition, where a relative reference location remains stationary, such as in FIG. 4 where the center of the panorama is used to indicate north, the reference location may also be associated with other portions of the panorama, for example, referring to panorama 100A of FIG. 4, the reference location may be along edges 420 or 430, and as a result, edge 340 of building 130 may be shifted to edge 420 or 430 in order to correspond to the orientation of the projection 100B.

Once the user is satisfied with the new, corrected orientation of the projection, the user may select an option to save the corrected orientation. As an example, the user may use a user input device of the computer to select a save button 350. In response, the computer may adjust the pose information associated with the requested panorama using the new, corrected orientation identified by the user's input. Thus, the next time a user requests the panorama, the adjusted pose information may be used to display or orient the panorama.

In addition to correcting the pose information associated with a panorama, the user may also be able to quickly and easily adjust the location. As an example, a user may select, using a user input device of the computer, the representation of the panorama overlaid on the map and drag it to a new location. For example, returning to FIG. 2, location 110, which indicates where the location where panorama 100A was captured, is in the middle of street 120. If location 110 were not aligned with the middle of street 220, the user may select, using a user input device of the computer, the projection 100B and drag it to a new location on map 210.

Once the user is satisfied with the new, corrected location of the projection, the user may select an option to save the corrected location. Again, the user may use a user input device of the computer to select a save button 330. In response, the computer may adjust or update the location information associated with the requested panorama using the new, location orientation identified by the user's input. Thus, the next time a user requests the panorama, the adjusted location information may be used to display the panorama.

Once the panorama are located and posed correctly, a user can then easily make the connections between them to create a virtual tour experience. The corrected information may also be used to correct or otherwise adjust relationships between panoramas in virtual tours which have already been created. As an example, one or more panoramas may be strung together based on their location and orientation such that a user may move from viewing one image to another image. If the panoramas are not oriented correctly, the transition between these panoramas can be very confusing. For instance, if a user is viewing a first panorama oriented in one direction (for example, north) and then transitions to a second panorama oriented incorrectly (for example, the northern direction is incorrectly labeled as the south) rather than moving forward in the space of the first panorama, the user may have the feeling of turning around or facing the wrong direction. This transition may become significantly smoother when the orientation information is corrected for the second panorama.

Figure 5:
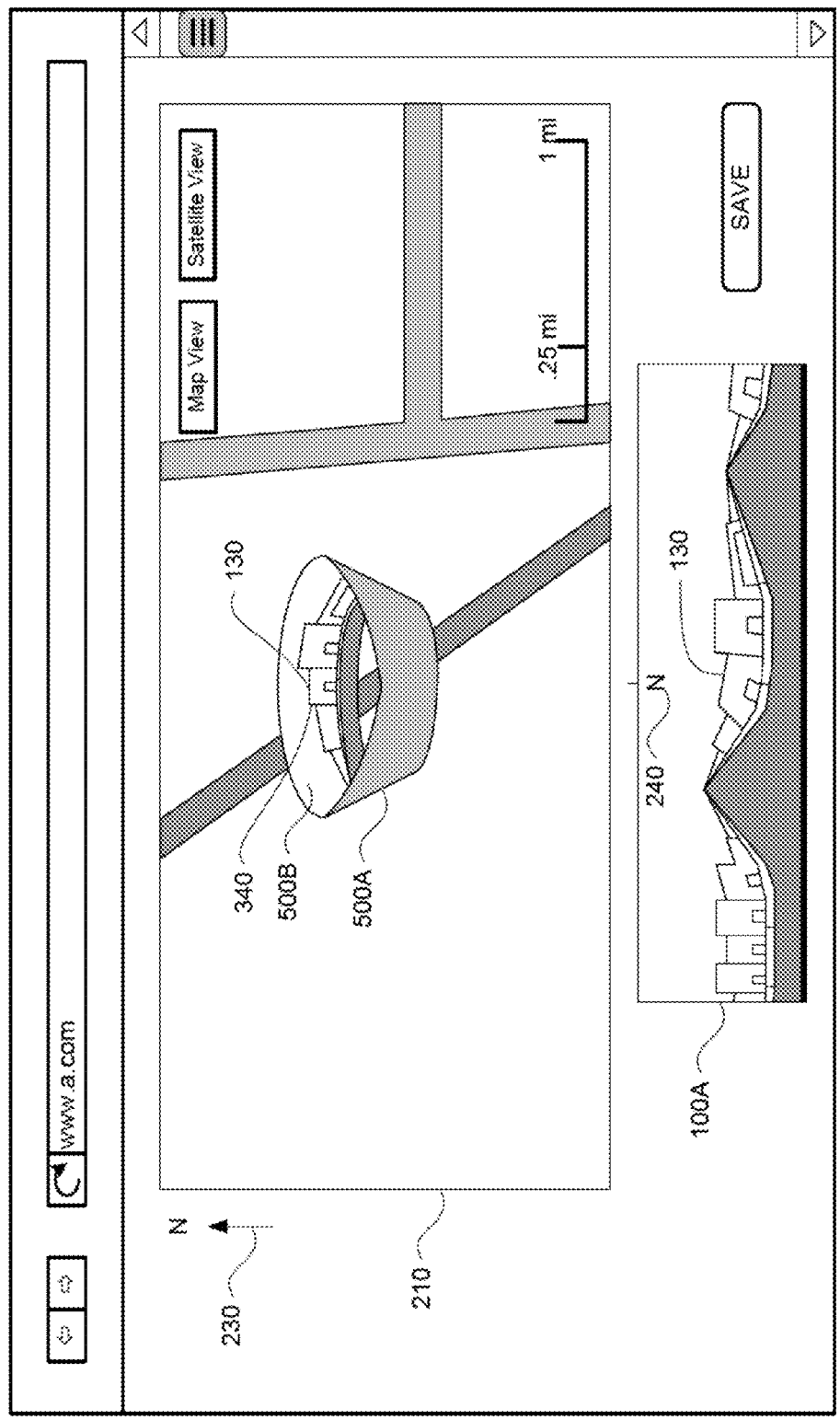
FIG. 5 is another example screen shot in accordance with aspects of the disclosure.

Although the examples discussed above utilize a stereographic projection, other representations may be used in conjunction with the features described herein. For example, FIG. 5 is an example representation 500A shaped as a frustum with the panorama 100A projected onto an interior surface 500B of the frustum. In this example, the sides of the frustum taper towards the bottom of the map 210. The side view of the representation allows the user to observe a portion of the features of the projection on a portion of the interior surface 500B. In this example, edge 340 of building 130 is oriented in the northern direction of map 210. As with the examples above, the user may use a user input of the computer to select and drag the representation 500A to the left or right. In response, the features of the panorama that are projected onto the interior surface 500B and the features of the panorama 100A may appear to slide to the left or right at the same time. Alternatively, the panorama may be projected one or both of the interior and exterior surfaces of the frustum.

Figure 6:
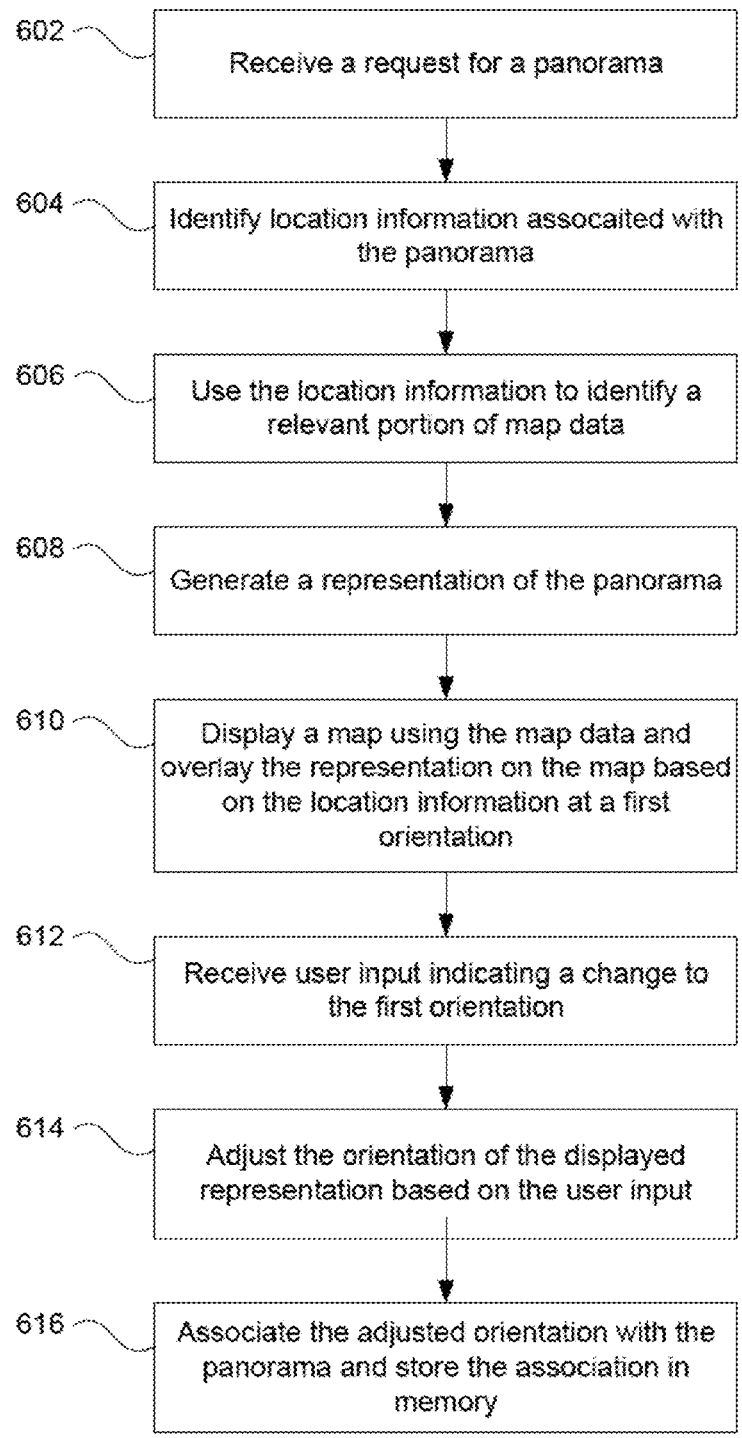
FIG. 6 is an example flow diagram in accordance with aspects of the disclosure.

FIG. 6 is an example flow diagram 600 of some of the features described above which may be performed by the user's computer. In this example, the computer receives a request for a panorama at block 602. In response, the computer identifies location information associated with the panorama and uses the location information to identify a relevant portion of map data at blocks 604 and 606, respectively. As noted above, the computer may achieve this by retrieving the location and/or map data from local storage or requesting the information from another computer such as a server over a network. At block 608 the computer generates a representation of the panorama. As discussed above, the representation may include various types of projections such as stereographic or a projection on an interior surface or exterior surface of a frustum. The computer then displays a map using the map data and overlays the representation of the map based on the location information at block 610. The representation is displayed at a first orientation based on a default value or using any pose information associated with the panorama. The computer receives user input indicating a change to the first orientation at block 612. In response, the computer adjusts the orientation of the displayed representation based on the user input at block 614. The computer also associates the adjusted orientation with the panorama and stores this information in memory, for example at the computer or a remote location, for later use at block 616.

EXAMPLE SYSTEM

FIGS. 7 and 8 include an example system 700 in which the features described above may be implemented. It should not be considered as limiting the scope of the disclosure or usefulness of the features described herein. In this example, system 700 can include computing devices 710, 720, and 730 as well as storage system 740. Computing device 710 can contain a processor 712, memory 714 and other components typically present in general purpose computers. Memory 714 of computer 710 can store information accessible by processor 712, including instructions 716 that can be executed by the processor 712.

Memory can also include data 718 that can be retrieved, manipulated or stored by the processor. The memory can be of any type capable of storing information accessible by the processor, such as a hard-drive, memory card, ROM, RAM, DVD, CD-ROM, write-capable, and read-only memories.

The instructions 716 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computer language including scripts or collections of independent source code modules that are interpreted on demand or compiled in advance. Functions, methods and routines of the instructions are explained in more detail below.

Data 718 can be retrieved, stored or modified by processor 712 in accordance with the instructions 716. For instance, although the subject matter described herein is not limited by any particular data structure, the data can be stored in computer registers, in a relational database as a table having many different fields and records, or XML documents. The data can also be formatted in any computer-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The processor 712 can be any conventional processor, such as commercially available CPUs. Alternatively, the processor can be a dedicated device such as an ASIC or other hardware-based processor. Although FIG. 7 functionally illustrates the processor, memory, and other elements of computer 710 as being within the same block, the processor, computer, or memory can actually comprise multiple processors, computers, or memories that can or cannot be stored within the same physical housing. For example, memory can be a hard drive or other storage media located in a housing different from that of computer 710. Accordingly, references to a processor, computer, or memory will be understood to include references to a collection of processors, computers, or memories that can or cannot operate in parallel.

The computer 710 can be at one node of a network 750 and capable of directly and indirectly communicating with other nodes of a network 750. Although only a few computers are depicted in FIGS. 7-8, it should be appreciated that a typical system can include a large number of connected computers, with each different computer being at a different node of the network 750. The network 750 and intervening nodes described herein, can be interconnected using various protocols and systems, such that each can be part of the Internet, World Wide Web, specific intranets, wide area networks, or local networks. These can use standard communications protocols or those proprietary to one or more companies, Ethernet, WiFi and HTTP, and various combinations of the foregoing.

As an example, computer 710 may include a web server that is capable of communicating with computers 720 and 730 via network. For example, server 710 may use network 750 transmit and present information to a user, such as user 760 or 770, on a display, such as displays 723 or 733 of computers 720 or 730. In this regard, computers 720 and 730 may be considered client devices and may perform all or some of the features described above with regard to FIGS. 2-6.

Each client device may be configured similarly to the server 710, with a processor, memory and instructions as described above. Each client device 720 or 730 may be a personal computer intended for use by a user 760 or 770, and have all of the components normally used in connection with a personal computer such as a central processing unit (CPU) 732, memory 734 (e.g., RAM and internal hard drives) storing data 738, and instructions 736, a display 733 (e.g., a monitor having a screen, a touch-screen, a projector, a television, a computer printer or other device that is operable to display information), user input 735 (e.g., a mouse, keyboard, touch-screen or microphone). The client device may also include a camera, speakers, a network interface device, and all of the components used for connecting these elements to one another.

Although the client devices 720 and 730 may each comprise a full-sized personal computer, they may alternatively comprise mobile devices capable of wirelessly exchanging data with a server over a network such as the Internet. By way of example only, client device 720 may be a wireless-enabled PDA, a cellular phone, a tablet PC, or a netbook capable of obtaining information via the Internet. The user may input information using a small keyboard, a keypad, or a touch screen.

Again, although FIGS. 7 and 8 depict computers (or servers) 710, 720 and 730 and storage system 740 as singular devices, these devices may each represent many computers or devices. For example, server 710 may also include many computers, e.g., a load balanced server farm, Storage system 740 may store map data and or panoramas such as those discussed above. As an example, user 770 may use user input 735 of client device 730 to request a panorama from server 710. In response, as described above, the server may retrieve map data and panoramas and associated information from storage system 740, and send the retrieved information to the client device 730 over network 750. When the client device 730 has received the information, the client device may generate a display such as those depicted in the examples of FIGS. 2-5. In this regard, client device 730 (or 720) may perform all or some of the blocks of FIG. 6. When location or pose information for a panorama has been adjusted, this information may be sent by the client device to server 710 for storage in the storage system 740.

The panoramas may be retrieved or collected from various sources. A panorama may be collected from any suitable source that has granted the system (and/or the general public) rights to access and use the image. The panoramas may be associated with location information and/or pose information.

Server 710 may have access to map data. The map data may include map-related information, at least a portion of which may be transmitted to a client device. As an example, map data may include map tiles, where each tile is a map image of a particular geographic area. Depending on the resolution (e.g., whether the map is zoomed in or out), one tile may cover an entire region, such as a state, in relatively little detail. Another tile may cover just a few streets in high detail. The map data is not limited to any particular format. For example, the images may comprise street maps, satellite images, or a combination of these, and may be stored as vectors (particularly with respect to street maps) or bitmaps (particularly with respect to satellite images). The various map tiles and/or vector data may be associated with geographical locations, such that the server 110 is capable of selecting, retrieving and transmitting this information in response to receipt of a geographical location, for example, in order to generate the display of map 210 of FIGS. 2-5.

In situations in which the systems discussed here collect personal images or information about users, or may make use of personal information, the users may be provided with an opportunity to control whether programs or features collect user information (e.g., information about a user's social network, social actions or activities, profession, a user's preferences, or a user's current location), or to control whether and/or how user information is used by the system. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how and what information is collected about the user and used by computers 710, 720, or 730.

In addition to providing for how user's personal information is stored and used, users may also be provided with an opportunity to control whether their own panoramic images are processed in accordance with the aspects described above. For example, as described above, the user may include a time limit on the use and dissemination of panoramic images. Similarly, if a user wants to share images privately, or only with a particular set of users, such images may be excluded. In addition, users may predesignate or identify particular ones of their own panoramic images for which they would like to allow correction of the orientation or location.

Although certain advantages are obtained when information is transmitted or received as noted above, other aspects of the subject matter described herein are not limited to any particular manner of transmission of information. Yet further, although some functions are indicated as taking place on a single computer having a single processor, various aspects of the subject matter described herein can be implemented by a multiple of computers, for example, communicating information over network 750.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
   receiving, by one or more computing devices, a request for a panorama associated with pose information;
   generating, by the one or more computing devices, a representation of the panorama;
   displaying, on a display, a map based on location information associated with the panorama;
   displaying the panorama proximate to the display of the map;
   overlaying, by the one or more computing devices, the representation onto the display of the map at a first orientation based on the location information associated with the panorama;
   receiving, by the one or more computing devices, user input indicating a change to the first orientation by a dragging action on the panorama;
   in response to receiving the user input, rotating the representation relative to the display of the map and sliding features of the panorama in a direction of the dragging action without changing position of the panorama relative to the display of the map; and
   updating, by the one or more computing devices, the pose information based on the user input.

2. The method of claim 1, further comprising providing the updated pose information to a server computer.

3. The method of claim 1, wherein the representation is a side view of a frustum with a portion of the panorama projected onto an interior surface of the frustum.

4. The method of claim 1, wherein the representation is a stereo graphic projection.

5. A system comprising:
   one or more computing devices, having one or more processors, the one or more computing devices being configured to:
      receive a request for a panorama associated with pose information from a user computing device;
      provide, in response to the received request, a representation of the panorama to the user computing device for a first orientation based on the pose information associated with the panorama;
      provide for display, on the user computing display, a map based on location information associated with the panorama;
      provide the panorama for display proximate to the display of the map;
      receive, from the user computing device, user input indicating a change to the first orientation by a dragging action on the representation;
      in response to receiving the user input, slide features of the panorama without changing position of the panorama relative to the display of the map and rotate the representation relative to the display of the map in a direction of the dragging action; and
      update the pose information associated with the panorama based on the user input.

6. The system of claim 5, wherein the representation is a stereographic projection.

7. The system of claim 5, wherein the representation is a side view of a frustum with a portion of the panorama projected onto an interior surface of the frustum.

8. The system of claim 5, further comprising:
   receiving a request for the panorama from a second user computing device; and
   providing the panorama with the updated pose information to the second user computing device.

9. A non-transitory, computer readable storage device on which computer readable instructions of a program are stored, the instructions, when executed by one or more processors, cause the one or more processors to perform a method, the method comprising:
   receiving a request for a panorama associated with pose information;
   generating a representation of the panorama;
   displaying a map based on location information associated with the panorama;
   displaying the panorama proximate to the display of the map;
   overlaying the representation onto the display of the map at a first orientation based on the location information associated with the panorama;
   receiving user input indicating a change to the first orientation by a dragging action on the representation;
   in response to receiving the user input, sliding features of the panorama without changing position of the panorama relative to the display of the map and rotating the representation relative to the display of the map in a direction of the dragging action; and
   updating the pose information based on the user input.

10. The device of claim 9, further comprising providing the updated pose information to a server computer.

11. The device of claim 9, wherein the representation is a side view of a frustum with a portion of the panorama projected onto an interior surface of the frustum.

* * * * *